(12) United States Patent
Brewster et al.

(10) Patent No.: US 11,175,470 B2
(45) Date of Patent: Nov. 16, 2021

(54) ENCLOSURE ASSEMBLIES FOR HANDLING MDC CONNECTORS AND ASSOCIATED CABLING

(71) Applicant: DMSI International, Venice, FL (US)

(72) Inventors: Robert Brewster, Ellijay, GA (US); Brandon Woodward, Venice, FL (US)

(73) Assignee: DMSI International, Venice, FL (US)

( * ) Notice: Subject to any disclaimer, the term of this patent is extended or adjusted under 35 U.S.C. 154(b) by 0 days.

(21) Appl. No.: 16/998,703

(22) Filed: Aug. 20, 2020

(65) Prior Publication Data

US 2021/0055495 A1     Feb. 25, 2021

Related U.S. Application Data

(60) Provisional application No. 62/889,190, filed on Aug. 20, 2019.

(51) Int. Cl.
*G02B 6/44*        (2006.01)
*G02B 6/38*        (2006.01)

(52) U.S. Cl.
CPC ........... *G02B 6/4453* (2013.01); *G02B 6/445* (2013.01); *G02B 6/4452* (2013.01); *G02B 6/3825* (2013.01); *G02B 6/3897* (2013.01)

(58) Field of Classification Search
CPC .............................. G02B 6/4453; G02B 6/445
USPC ......................................................... 385/135
See application file for complete search history.

(56) References Cited

U.S. PATENT DOCUMENTS

| | | | |
|---|---|---|---|
| 5,363,465 A | 11/1994 | Korkowski et al. | |
| 6,824,312 B2 | 11/2004 | McClellan et al. | |
| 6,920,274 B2 | 7/2005 | Rapp et al. | |
| 7,054,163 B2 * | 5/2006 | Coffey | H04Q 1/14 361/730 |
| 7,376,322 B2 * | 5/2008 | Zimmel | G02B 6/4454 385/135 |
| 7,495,931 B2 * | 2/2009 | Clark | H05K 7/1425 361/790 |
| 8,184,938 B2 | 5/2012 | Cooke et al. | |
| 8,705,928 B2 | 4/2014 | Zimmel et al. | |
| 8,712,206 B2 * | 4/2014 | Cooke | G02B 6/444 385/135 |
| 9,435,975 B2 | 9/2016 | Ott | |
| 10,126,514 B2 | 11/2018 | Cooke et al. | |
| 10,444,456 B2 | 10/2019 | Cooke et al. | |
| 10,732,371 B2 * | 8/2020 | Campbell | G02B 6/4478 |
| 2011/0274402 A1 * | 11/2011 | Giraud | G02B 6/4452 385/135 |

\* cited by examiner

*Primary Examiner* — Sung H Pak
(74) *Attorney, Agent, or Firm* — Suiter Swantz pc llo (57) ABSTRACT

Fiber optic assemblies for receiving, managing and facilitating access to optical fiber connectors are disclosed. The assemblies include an adapter panel slidably mounted in a chassis and defining a plurality of receiving bays each for receiving at least one cassette containing an optical fiber adapter. Each cassette includes retention features for being received within paired openings in the adapter panel to register a position of the cassette relative to the receiving bay and adapter panel. Cassettes are independently and selectively accessible and removable from either the front or back of the adapter panel.

19 Claims, 9 Drawing Sheets

ENCLOSURE ASSEMBLIES FOR HANDLING MDC CONNECTORS AND ASSOCIATED CABLING

CROSS REFERENCE AND INCORPORATION BY REFERENCE

This application claims the benefit of U.S. Provisional Application No. 62/889,190 filed Aug. 20, 2019, the disclosure of which is incorporated by reference herein in its entirety.

TECHNICAL FIELD

The subject matter disclosed herein is directed generally to fiber optic hardware and equipment, and more particularly, to components, assemblies and systems for receiving, managing and facilitating access to optical connectors and associated cabling.

BACKGROUND

Continued demand for capacity in fiber optic networks has led to the development of small form factor optical connectors. One such connector includes the Mini Duplex Connector (MDC) available from US Conec of Hickory, N.C.

The MDC connector is a two-fiber connector manufactured using the same 1.25 mm ceramic ferrule technology found in standard LC connectors. Compared to a standard duplex LC connector having a ferrule pitch of 6.25 mm, the MDC connector provides a ferrule pitch of 3.5 mm, thereby allowing approximately 4 mm spacing between adjacent MDC connectors. For example, three port MDC adapters can fit directly into standard panel openings for duplex LC adapters thereby increasing fiber density by a factor of three. Insertion and removal of an MDC connector occurs with a simple push or pull on a flexible and robust strain relief boot providing functional density in tight spaces.

With the advent of new optical connectors comes the need for associated hardware and equipment for implementing the new connectors in an optical network environment. Therefore, the present disclosure provides components, assemblies and systems for managing, organizing and facilitating access to MDC connectors.

BRIEF SUMMARY

In a first embodiment, the present disclose provides a fiber optic assembly for mounting in a rack including a chassis defining an interior, an adapter panel slidably mounted in the interior, the adapter panel defining a plurality of receiving bays open along a front and a back of the adapter panel, wherein each of a top and a bottom of the adapter panel includes a linear array of spaced openings extending between spaced sides of the adapter panel, and wherein the spaced openings in the top align with the spaced openings in the bottom to form vertically aligned pairs of spaced openings with each pair of spaced openings including one top opening and one bottom opening, and wherein each pair of spaced openings corresponds to one position in one of the plurality of receiving bays, and a plurality of cassettes received in the plurality of receiving bays in a vertical orientation, wherein each of the plurality of cassettes includes two retention features for engaging in one pair of the pairs of spaced openings to register a cassette position relative to a respective one of the plurality of receiving bays, wherein each of the plurality of cassettes is independently accessible and removable from either the front or the back of the adapter panel.

In some embodiments, each of the plurality of cassettes includes a housing having spaced sides, and wherein each of the two retention features comprises a ball bearing disposed in a pocket formed in one of the spaced sides, the pocket containing a spring outwardly biasing the ball bearing toward a respective lateral side of the housing.

In some embodiments, each of the plurality of cassettes includes a pair of spaced tabs positioned at a forward end of the housing for manipulating the cassette position relative to the adapter panel.

In some embodiments, each of the plurality of receiving bays are defined between two adjacent vertical dividers or between one vertical divider and one side of the spaced sides of the adapter panel, and wherein each vertical divider comprises lateral features for engaging two adjacent ones of the plurality of cassettes.

In some embodiments, each of the plurality of receiving bays are subdivided into two sub-bays by a pair of vertically aligned spaced guides, and wherein each pair of vertically aligned spaced guides engages two adjacent ones of the plurality of cassettes.

In some embodiments, each of the plurality of cassettes includes a housing having spaced sides each including an elongate first rail and an elongate second rail, wherein the first rails engage with the lateral features of one of the vertical dividers and the second rails engage with one of the pairs of vertically aligned spaced guides.

In some embodiments, each of the plurality of receiving bays is dimensioned to receive two cassettes of the plurality of cassettes.

In some embodiments, the assembly further includes guides disposed in the interior of the chassis and rails affixed to the adapter panel and engaged with the guides, wherein the guides and the rails guide horizontal translation of the adapter panel relative to the chassis.

In some embodiments, each of the plurality of cassettes includes one adapter having a frontside including a plurality of vertically stacked ports for receiving a corresponding number of mini duplex connector (MDC) optical fiber connectors, and a backside for receiving connectorized optical fibers from within the cassette.

In another embodiment, the present disclosure provides an adapter panel assembly for being slidably mounted in an interior of a rack-mountable chassis including an adapter panel having a top and a bottom interconnected by spaced sides, the adapter panel defining a plurality of receiving bays open along a front and a back of the adapter panel, each of the top and the bottom of the adapter panel including a linear array of spaced openings extending between the spaced sides, wherein the spaced openings in the top align with the spaced openings in the bottom to form vertically aligned pairs of spaced openings with each pair of spaced openings including one top opening and one bottom opening, and wherein each pair of spaced openings corresponds to one position in one of the plurality of receiving bays, and a plurality of cassettes received in the plurality of receiving bays in a vertical orientation, wherein each of the plurality of cassettes includes two retention features for engaging in one pair of the pairs of spaced openings to register a cassette position relative to a respective one of the plurality of receiving bays, wherein each of the plurality of cassettes is independently accessible and removable from the front or the back of the adapter panel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

The present disclosure provides embodiments of rack-mountable optical fiber equipment for implementing MDC connectors in an optical network.

Referring to FIGS. 1-4, an enclosure assembly 100 according to the present disclosure includes a chassis 102 adapted to mount in a standard rack, for instance standard 19" rack mounting. The chassis 102 generally includes a top, a bottom, a back and a front. In some embodiments, the chassis 102 includes a removable top cover 104. The back of the chassis 102, indicated at reference numeral 106, generally provides cable management and retention via retention features 108. The front of the chassis 102, indicated at reference numeral 110, generally provides a front opening for accessing the adapter panel, MDC cassettes and MDC connectors as discussed below. A door 112 coupled to the front of the chassis 102 is movable between open and closed positions. For example, the door 112 may pivot open and downward as shown to clear the front of the chassis to allow the adapter panel to slide in a forward direction above the open door. One or more handles 114 may be provided on the front of the door 112 for moving the door between the open and closed positions. In some embodiments, a retainer may be provided on the front of the chassis to retain the door in the closed position. For example, at least one permanent magnet may be affixed to the chassis positioned to attract the door to maintain the door in the closed position. Brackets 116 affixed to opposing sides of the chassis 102 are provided for standard rack mounting.

Figure 4:
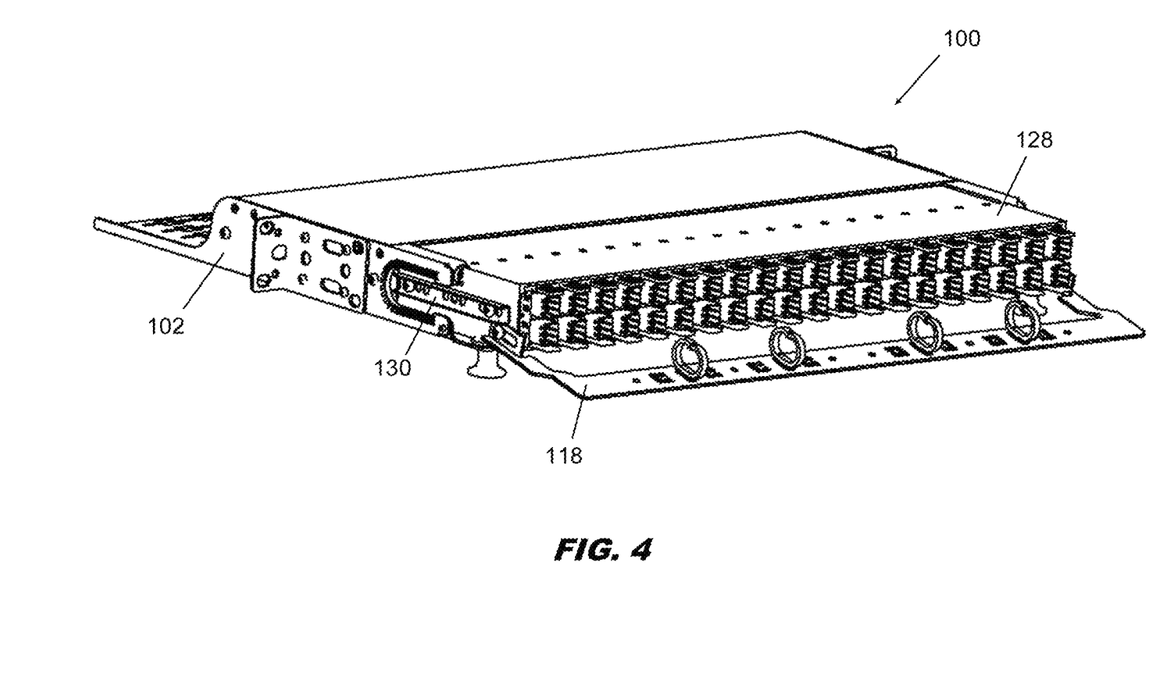
FIG. 4 is a front perspective view of the enclosure assembly of FIG. 1 showing the coupling of the cable management bar to the adapter panel.

As best shown in FIG. 4, a cable management bar 118 coupled to the adapter panel near the front of the chassis 102 moves with the adapter panel relative to the chassis 102 and may move relative to the adapter panel by way of translation and/or pivoting movement. In some embodiments, the cable management bar 118 may be used to manipulate the adapter panel between its forward, rearward and intermediate positions as discussed below. The cable management bar 118 may move relative to the chassis 102 between a first position in which the bar is within the chassis and a second position in which the bar is substantially outside of the chassis, such as above the door when the door is in the open position. Left and right lateral sides of the cable management bar 118 may each define an elongate slot within which posts carried on the opposing outboard sides of the adapter panel travel as the bar moves between the first and second positions. Cable rings 120 may be provided on the cable management bar 118 which secure in cable ring receiving features 122 provided along a length of the cable management bar 118. The cable rings 120 serve to manage cables entering and exiting the enclosure assembly. For example, cables may enter and exit the enclosure assembly 100 through cutouts 124 provided at the front of the chassis 102 on both opposing sides of the chassis. The retention features 108 provided at the back of the chassis 102 serve to locate and attach, for example, furcation bodies, cable tie-downs, etc. for managing cables entering and exiting the back of the enclosure assembly 100. In some embodiments, the retention features 108 include shaped openings to slide-lock engage furcation bodies or other components.

Figure 1:
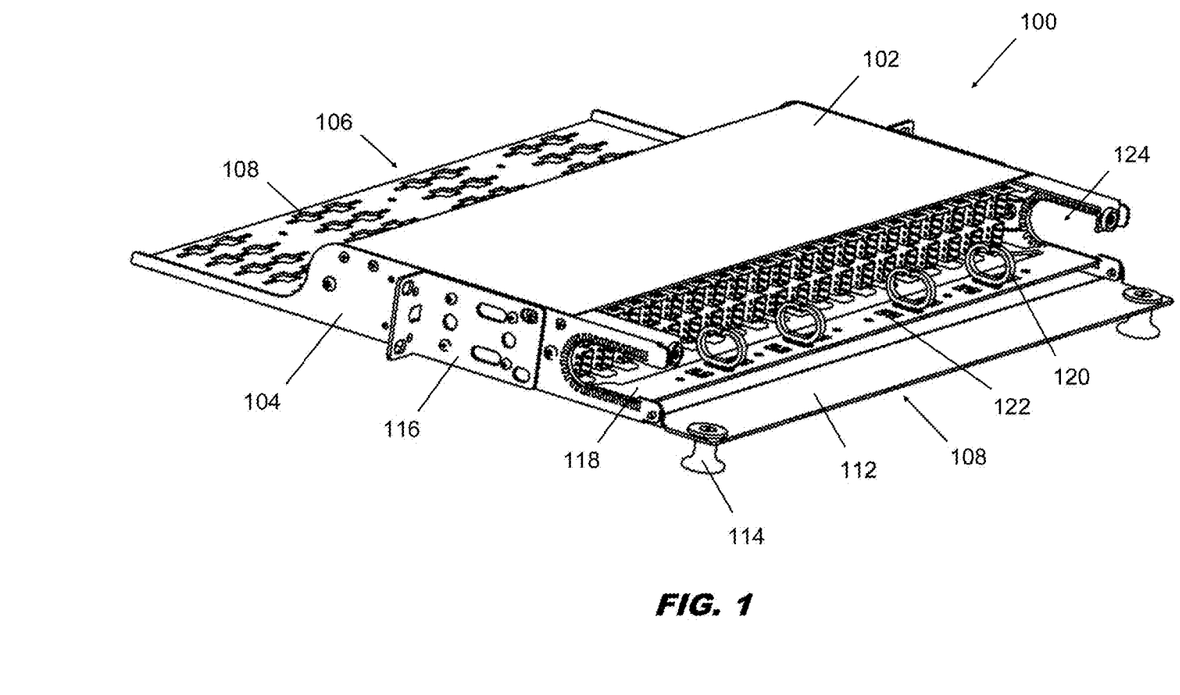
FIG. 1 is a front perspective view of an enclosure assembly according to an embodiment of the present disclosure.
Figure 2:
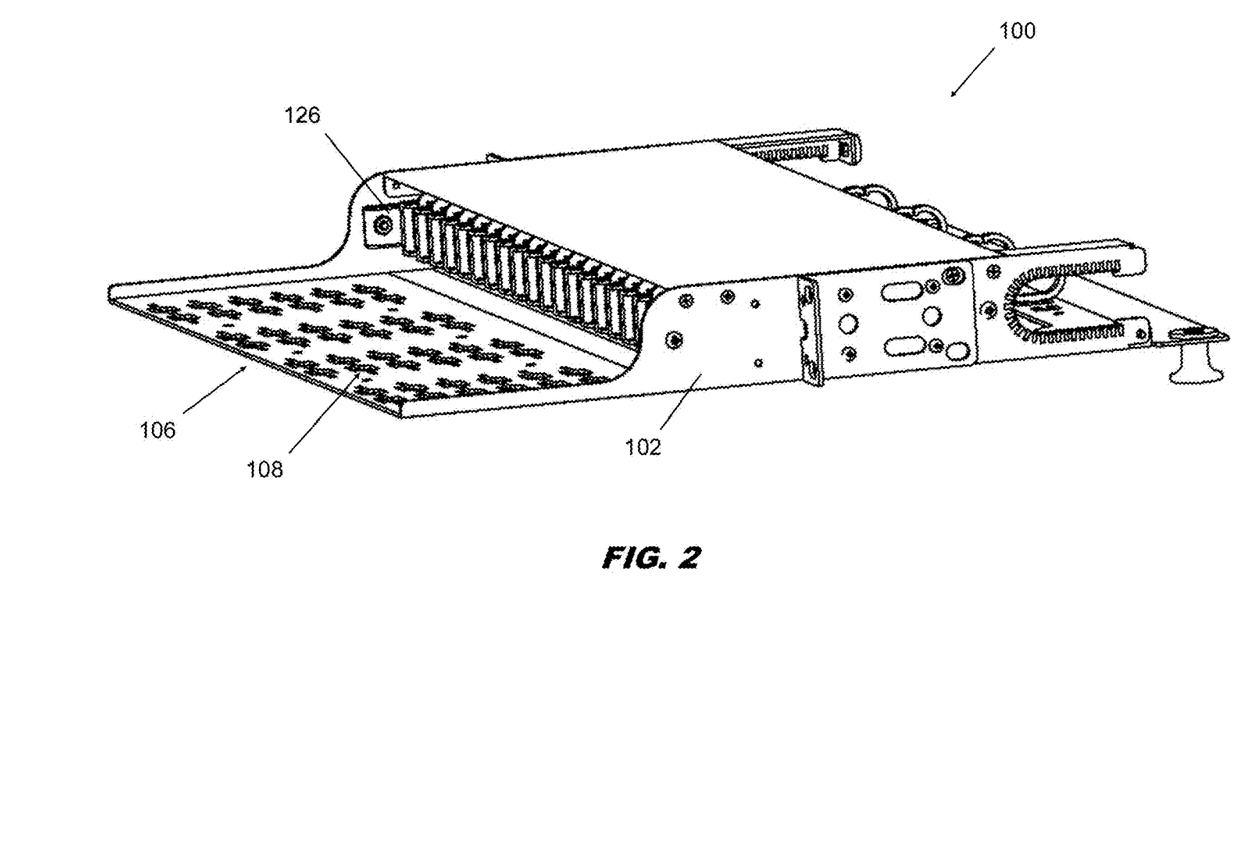
FIG. 2 is a rear perspective view of the enclosure assembly of FIG. 1.
Figure 3:
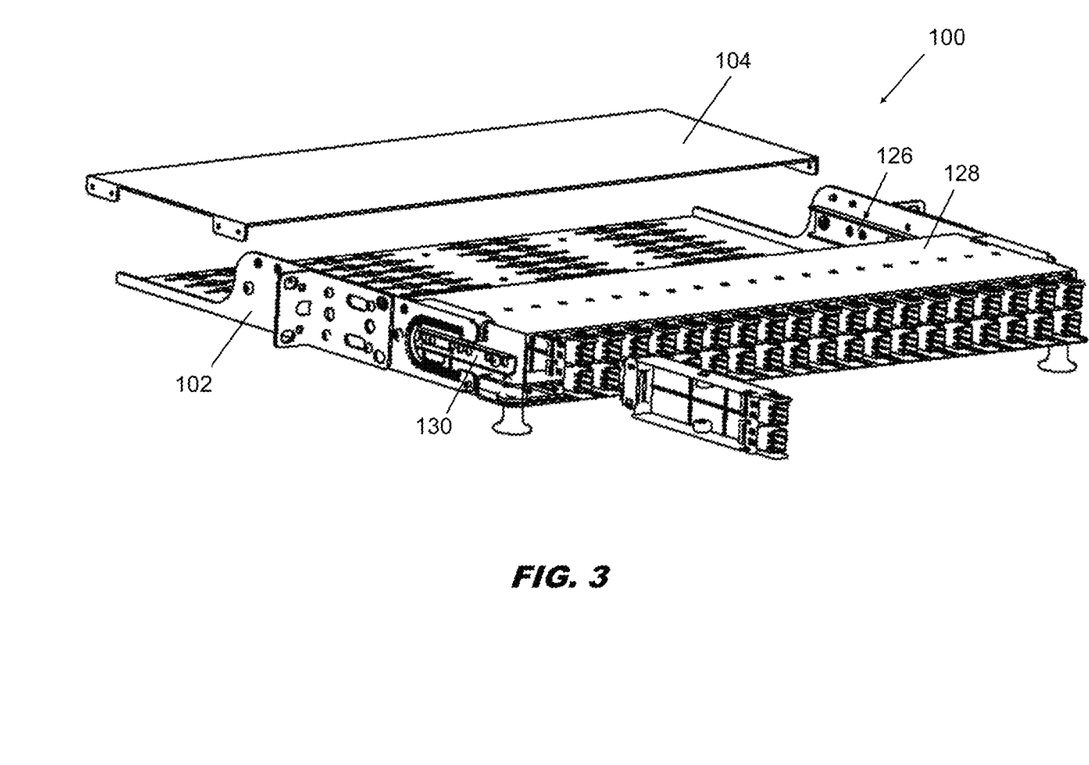
FIG. 3 is a front perspective view of the enclosure assembly of FIG. 1 showing the top cover and a single MDC cassette removed and the adapter panel in a forward position.

As best shown in FIGS. 2 and 3, elongate guides 126 symmetrically arranged on the opposing inboard sides of the chassis 102 serve to guide the horizontal translation of the adapter panel 128 between the fully forward and fully rearward positions of the adapter panel. Non-limiting examples of guides 126 include drawer slides, telescoping slides and roller tracks. Corresponding rails 130 symmetrically arranged on the opposing outboard sides of the adapter panel 128 engage the guides 126. A non-limiting example of an alternative to rails includes rollers carried on the sides of the adapter panel engaged to roll along the guides 126. The guides 126 and rails 130 allow the adapter panel to selectively translate horizontally forward relative to the chassis 102 as shown in FIG. 3, and rearward relative to the chassis as shown in FIG. 2. Thus, in some embodiments, the adapter panel 128 can be selectively moved between fully forward and fully rearward positions through at least one intermediate position, for instance a 'neutral' position as shown in FIG. 1. In the fully forward position shown in FIG. 3 the front of the adapter panel 128 may clear the open door to facilitate access to the cassettes and MDC connectors, which can be installed from the frontside or backside of the adapter panel as discussed below.

Figures 5A, 5B:
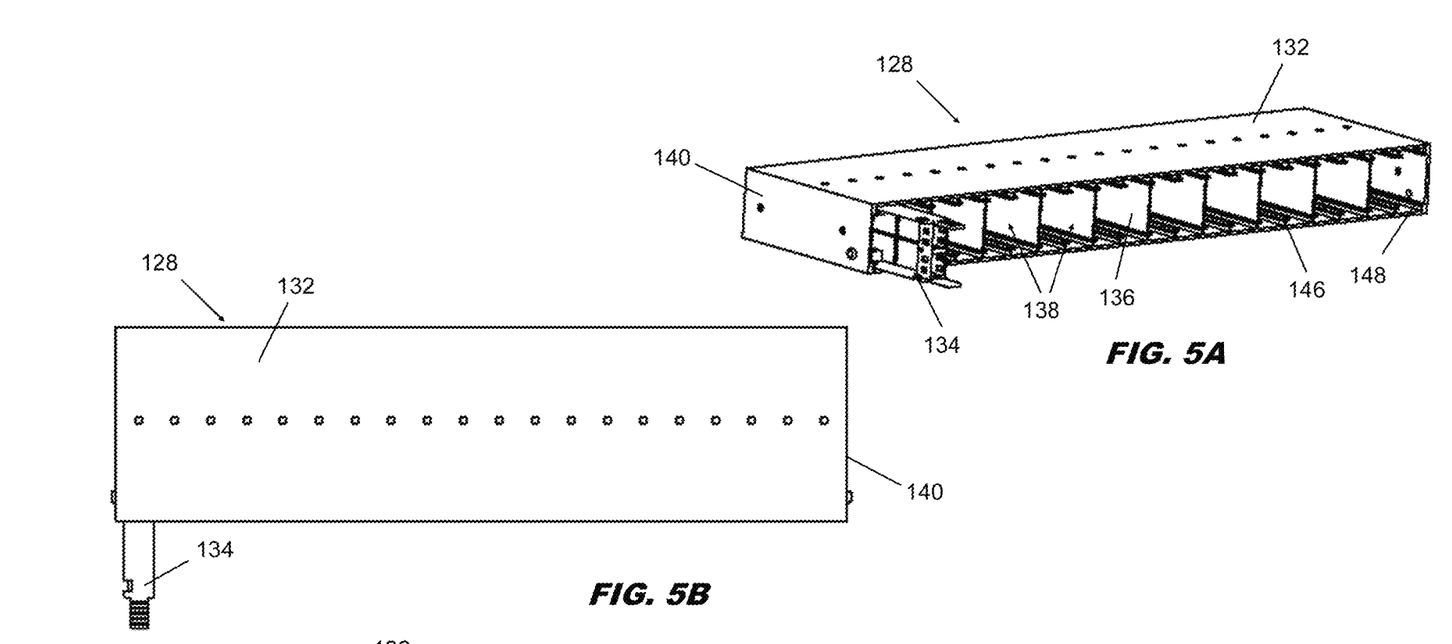
FIGS. 5A, 5B and 5C are respective perspective, top and front views of the adapter panel of the enclosure assembly of FIG. 1.
Figure 5C:
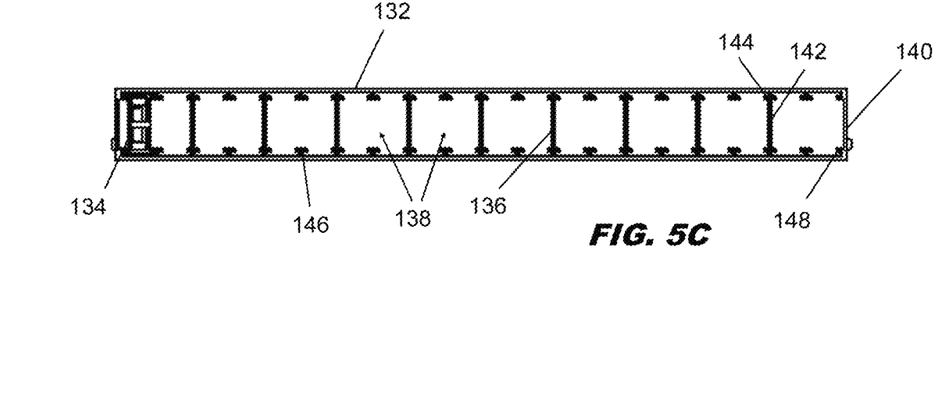

Referring to FIGS. 5A, 5B and 5C, the adapter panel 128 generally includes a housing 132 having an open front, an open back, a closed top, a closed bottom, and closed opposing sides. The housing 132 is open from front to back such that the MDC cassettes 134 can be inserted and removed from the front or back of the housing 132. As used herein, the term "cassette" refers to any of the cassette embodiments disclosed herein including, but not limited to, a connectorized MDC cassette, a patching MDC cassette, and a pre-terminated tailed MDC cassette. A plurality of parallel, vertically-oriented internal dividers 136 divide the opening through the housing 132 into a plurality of bays 138 each for receiving at least one MDC cassette 134. For example, FIG. 5C shows nine (9) internal dividers 136 dividing the opening through the adapter panel 128 into ten (10) separate bays 138. The opposing end bays 138 are each provided between one sidewall 140 of the adapter panel 128 and one of the internal dividers 136, while each interior bay 138 is provided between two adjacent internal dividers 136. In some embodiments, each divider 136 includes a vertical portion 142 extending continuously between the top and bottom of the adapter panel 128 and lateral portions 144 extending in opposite directions away from the vertical portion 142 proximate and spaced apart from each of the top and bottom of the adapter panel thereby forming a space between the lateral portions and the respective top and bottom of the adapter panel, the spaces serving as guides for receiving a rail of the received MDC cassette 134.

In some embodiments, each bay 138 is further subdivided into two equal sized portions or 'sub-bays' each dimensioned to receive a single MDC cassette 134. For example, T-shaped guides 146 affixed to the inner surface of the top and bottom of the adapter panel 128 and extending toward the opposite side are vertically aligned to subdivide each bay 138 into two sub-bays. Each pair of T-shaped guides 146 cooperates with the internal dividers 136 or sidewall guides 148 on the left and right sides to guide horizontal translation of the MDC cassettes 134. Cooperation of the adapter panel interior surface of the top, interior surface of the bottom, sidewall guides 148, T-shaped guides 146, and internal dividers 136 serve to retain, align parallel, and guide horizontal translation of the MDC cassettes 134. As shown, and discussed further below, each MDC cassette 134 has a length, width and height dimension, wherein in some embodiments the width is greater than the height and the length is greater than the width. Each interior bay 138 and sub-bay is dimensioned to receive the MDC cassettes 134 in horizontal alignment with each MDC cassette 134 oriented vertically, i.e., lateral axis oriented vertically. In some embodiments, each MDC cassette 134 is configured to hold two separate MDC adapters, for instance two three-port MDC adapters. As such, and for example as shown, the adapter panel 128 is configured to hold twenty (20) MDC cassettes 134 side-by-side with each MDC cassette 134 including two MDC three-port adapters to provide two hundred and forty (240) optical connections via 120 MDC connectors.

Figure 6A:
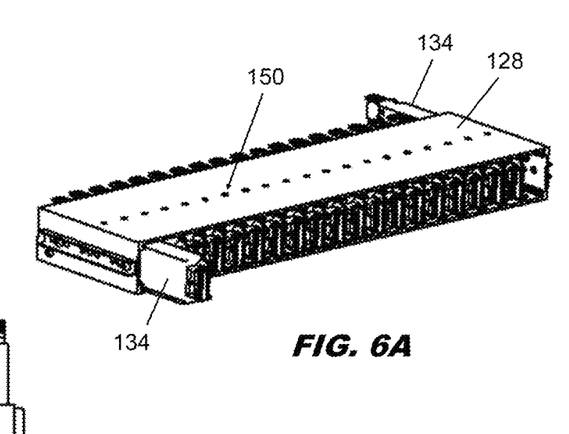
FIGS. 6A and 6B are respective perspective and top views showing the adapter panel populated with a plurality of MDC cassettes and showing MDC cassette positions.
Figure 6B:
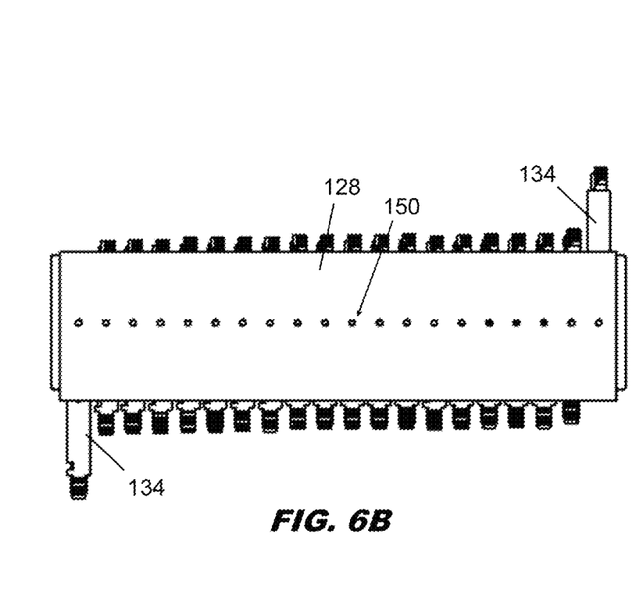
Figure 7A:
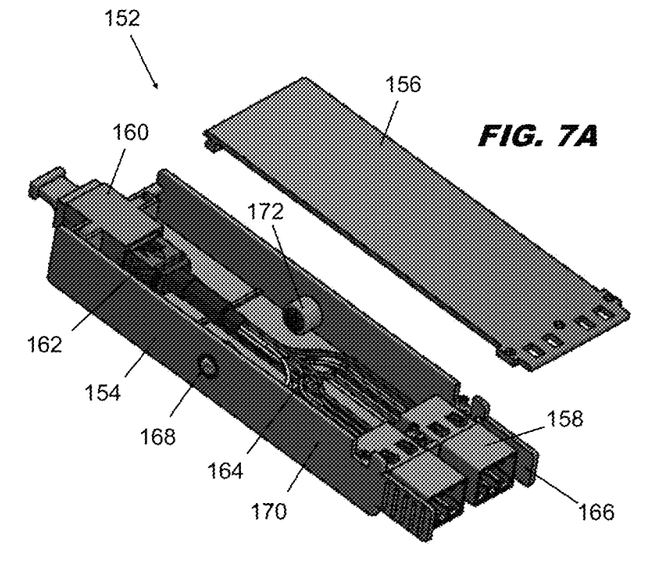
FIGS. 7A, 7B, 7C and 7D are respective perspective, top, side and front views of a connectorized MDC cassette according to an embodiment of the present disclosure.
Figure 7B:
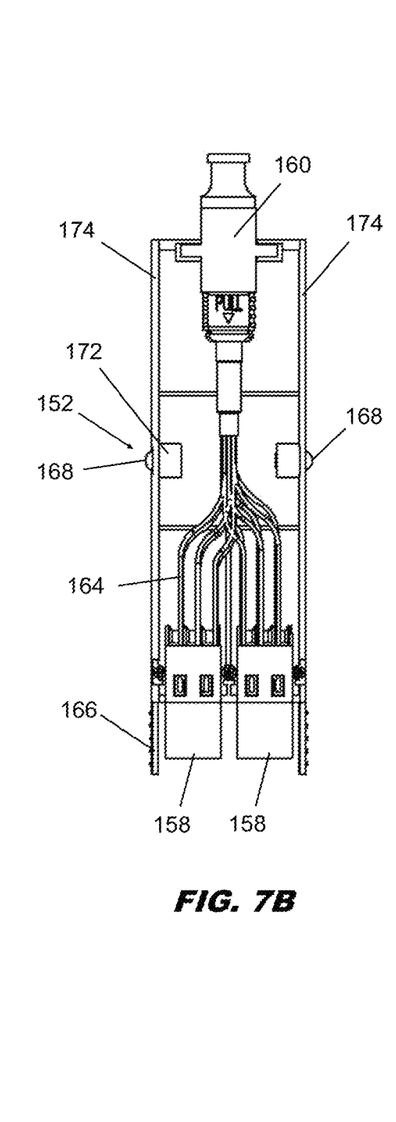
Figure 7C:
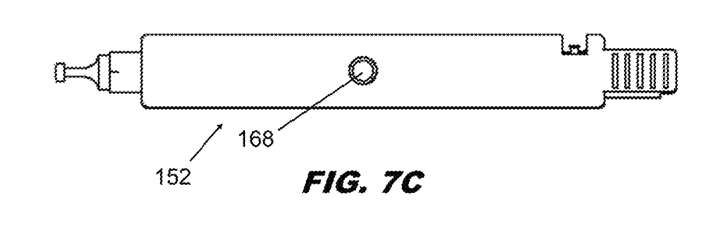
Figure 7D:
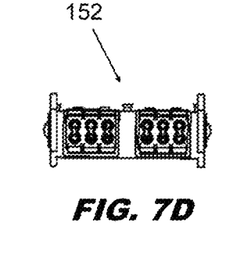
Figures 8A, 8C, 8D:
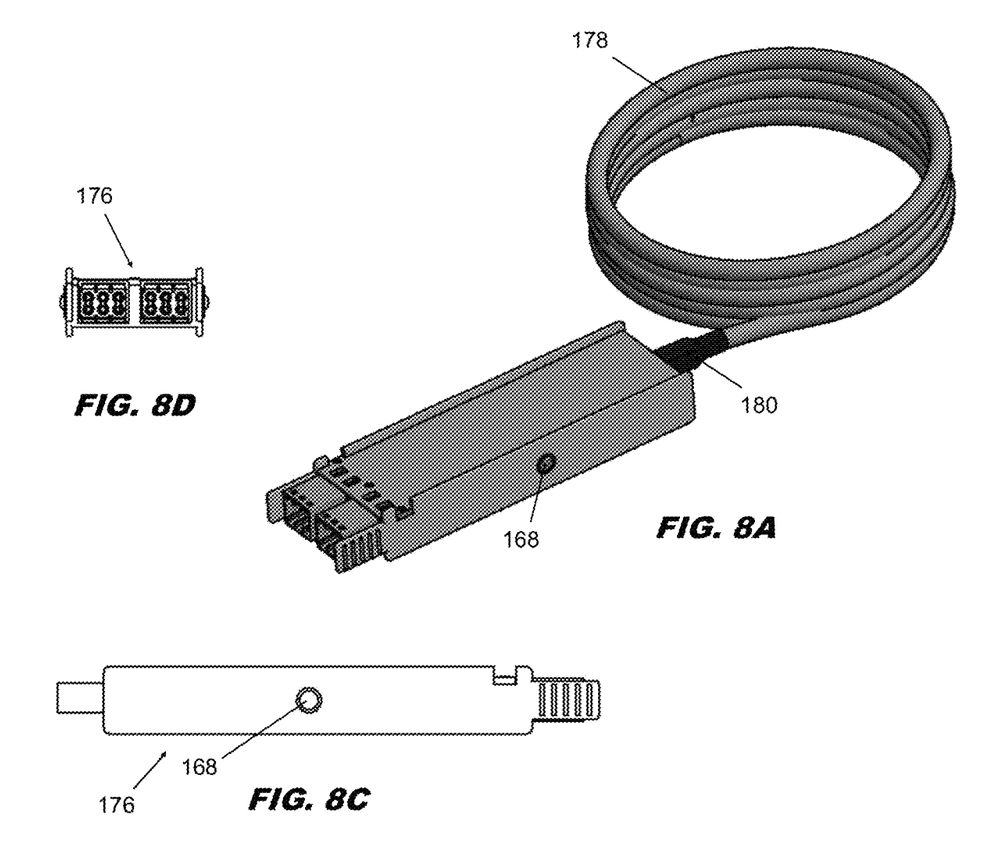
FIGS. 8A, 8B, 8C and 8D are respective perspective, top, side and front views of a pre-terminated tailed MDC cassette according to the present disclosure.
Figure 8B:
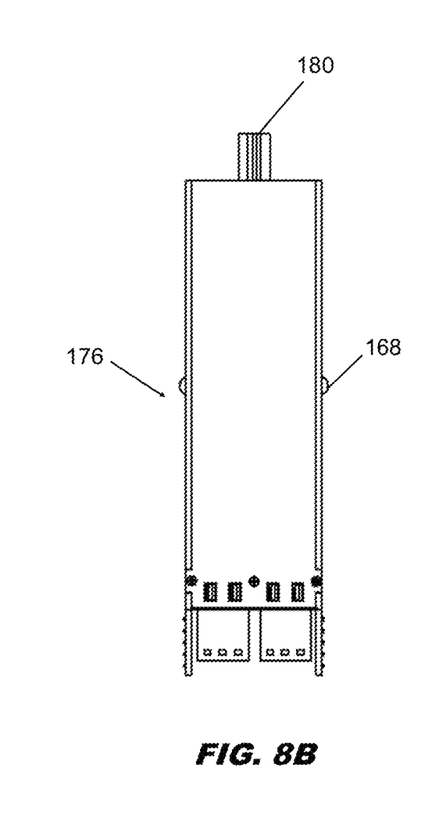
Figure 9A:
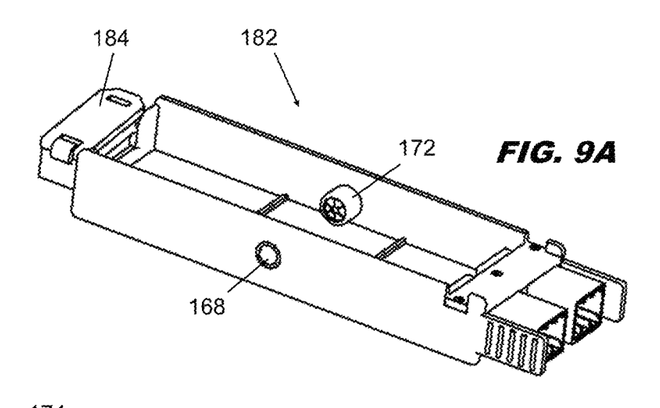
FIGS. 9A, 9B, 9C and 9D are respective perspective, top, side and front views of a patching MDC cassette according to the present disclosure.
Figure 9B:
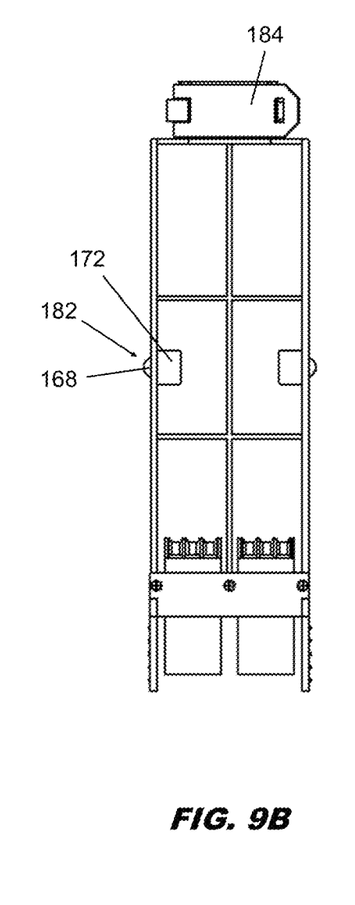
Figure 9C:
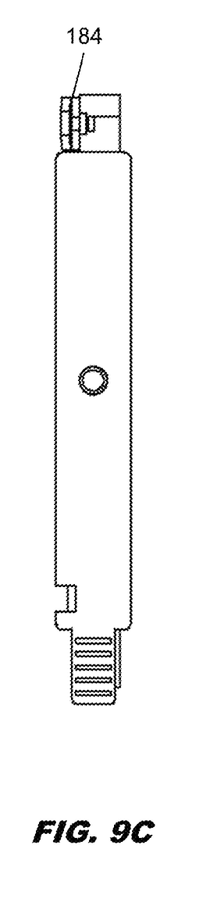
Figure 9D:
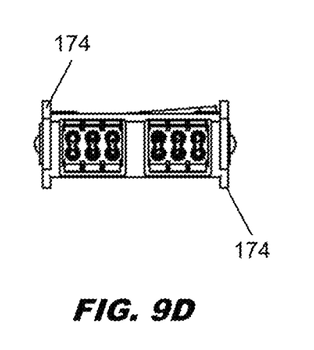

Referring to FIGS. 6A and 6B, each of the top and bottom of the adapter panel 128 includes a linear array of spaced openings 150 extending between the opposing left and right sides of the adapter panel. Each of the spaced openings 150, which can be a thru-hole, cavity, recess, etc., is provided for receiving a spring-biased ball bearing of an MDC cassette 134 to register the position of the MDC cassette within its respective bay and relative to the adapter panel 128. In some embodiments, the spaced openings 150 are positioned to register the MDC cassettes 134 in their 'neutral position' corresponding to a use position, i.e., not translated forward or rearward relative to the adapter panel 128. The linear array of spaced openings 150 align the MDC cassettes 134 is side-by-side horizontal alignment. The number of pairs of spaced openings 150, i.e., each pair including a top opening and a vertically aligned bottom opening from receiving respective 'top' and 'bottom' ball bearings of the cassette when turned on its side, corresponds to the number of MDC cassettes 134. For example, FIGS. 5A and 5B show twenty (20) pairs of spaced openings 150 for registering twenty (20) MDC cassettes 134.

The adapter panel 128 can be configured with any number of internal dividers 136, T-shaped guides 146, and pairs of spaced openings 150 for receiving, aligning and registering any number of MDC cassettes 134. For example, FIGS. 6A and 6B show the MDC cassettes 134 oriented vertically and aligned horizontally in a single row along the face of the adapter panel 128 in a 1 U width accommodating twenty (20) MDC cassettes 134 each including two MDC adapters, with each MDC adapter configured to receive three dual fiber MDC connectors in a vertical stack, for a total of 240 fiber connections per row of MDC cassettes 134. Other densities, MDC cassette orientations, MDC adapter orientations, and adapter configurations are possible. FIGS. 6A and 6B also show the far left MDC cassette 134 translated forward relative to the adapter panel 128 to a forward position in which the spring-loaded ball bearings are free of their respective openings 150, the far right MDC cassette 134 translated rearward relative to the adapter panel 128 to a rearward position in which the spring-loaded ball bearings are free of their respective openings 150, and the MDC cassettes positioned between the far right and far left in the 'neutral' position corresponding to the use position in which the spring-loaded ball bearings are registered in their respective paired openings 150. MDC cassette positions other than those shown in FIGS. 6A and 6B are possible as well as removal entirely from the adapter panel 128. Each MDC cassette 134 move independently forward or rearward in the adapter panel to provide access to the MDC optical connectors at the front of the or optical connections at the back of the MDC cassettes.

Referring to FIGS. 7A, 7B, 7C and 7D, shown is a first non-limiting example of an MDC cassette configured as a connectorized MDC cassette 152, for instance an MTP MDC cassette. The connectorized MDC cassette 152 generally includes a housing 154 having a front, a back, opposing sides, a closed bottom, and an open top closeable by a removable cover 156. In some embodiments, the removable cover 156 may snap-fit engage the housing for toolless removal. In other embodiments, fasteners such as screws may be used to secure the removable cover 156 to the housing 154. The housing 154 defines an internal compartment open at the front end for receiving at least one MDC adapter 158 and open at the back end for receiving at least one other optical adapter, for instance an MTP adapter 160. Inside the internal compartment, an MTP connector 162 may be received in the MTP adapter 160 and optical fibers 164 having connectorized ends may be received in the backside of the MDC adapters 158 at the front of the housing. In this configuration, MDC optical connectors received in the frontside of the MDC adapters 158 can be optically connected to optical fibers of an MTP connector (not shown) received in the backside of the MTP adapter 160 at the back of the housing via the optical fibers managed within the internal compartment. In other words, the connectorized MDC cassette 152 optically connects the optical fibers of MDC connectors received on the front of the cassette with optical fibers of an MTP connector received on the back of the cassette.

The MDC adapters 158 may include any number of ports, for instance the six ports shown provided in two groups of three ports thereby providing twelve optical connections. In some embodiments, all ports may be provided in one single MDC adapter. The adapters serve to align the facing ferrules. In some embodiments, the MDC cassette includes forward extending tabs 166 at the front of the housing 154 positioned alongside the MDC adapters 158 used to grab the cassette to move the cassette between its achievable positions, among other functions. Each connectorized MDC cassette 152 includes two retention features for registering the position of the MDC cassette relative to the adapter panel. As shown, each retention feature includes a ball bearing 168 located in a housing sidewall 170 which is outwardly biased toward a respective lateral side of the housing, or 'top' and 'bottom' of the housing when viewed installed in the adapter panel. A pocket 172 affixed to the sidewall and positioned in the internal compartment serves to seat a spring or other biasing member that functions to urge the ball bearing 168 laterally outward, as viewed in FIG. 7A.

Each connectorized MDC cassette 152 includes two retention features symmetrically arranged on the left and right sides, or top and bottom, depending on the installation orientation. During installation, the ball bearings 168 deflect into their respective pocket 172 while remaining in contact with the top or bottom of the inside of the adapter panel, and when aligned with their respective opening 150, seat within the opening 150 to retain the connectorized MDC cassette 152 in a registered position relative to the adapter panel. The connectorized MDC cassette 152 can be translated forward or rearward by applying a force to the connectorized MDC cassette 152 sufficient to overcome the spring force on the ball bearings 168. The connectorized MDC cassette 152 can be manipulated using left and right tabs 166 positioned at the front. The sidewalls 170 of the housing 154 extend above and below the respective top and bottom of the housing to provide elongate rails 174 that engage the internal dividers 136 and T-shaped guides 146 to guide translation of the connectorized MDC cassettes 152.

Referring to FIGS. 8A, 8B, 8C and 8D, shown is a second non-limiting example of an MDC cassette configured as a pre-terminated tailed MDC cassette 176. The pre-terminated tailed MDC cassette 176 differs from the connectorized MDC cassette 152 in terms of the backside configuration and includes a cable pass through disposed at the back of the housing 154 for exiting a length of cable 178 from the internal compartment. A strain relief boot 180 may be affixed to the back of the housing 154 for providing strain relief to the exiting cable 178.

Referring to FIGS. 9A, 9B, 9C and 9D, shown is a third non-limiting example of an MDC cassette configured as a patching MDC cassette 182. The patching MDC cassette 182 differs from each of the connectorized MDC cassette 152 and the pre-terminated tailed MDC cassette 176 in terms of the backside configuration and includes a rear opening and clamp 184 positioned at the rear opening for clamping around an optical fiber cable. In some embodiments, the clamp 184 includes a hinged part and a latch for maintaining the hinged part closed. In some embodiments, the clamp parts are lined with resilient members for compressing on the exiting cable under the force of the closed hinged part.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A fiber optic assembly for mounting in a rack, comprising:
   a chassis defining an interior;
   an adapter panel slidably mounted in the interior, the adapter panel defining a plurality of receiving bays open along a front and a back of the adapter panel, wherein each of a top and a bottom of the adapter panel includes a linear array of spaced openings extending between spaced sides of the adapter panel, and wherein the spaced openings in the top align with the spaced openings in the bottom to form vertically aligned pairs of spaced openings with each pair of spaced openings including one top opening and one bottom opening, and wherein each pair of spaced openings corresponds to one position in one of the plurality of receiving bays; and
   a plurality of cassettes received in the plurality of receiving bays in a vertical orientation, wherein each of the plurality of cassettes includes two retention features for engaging in one pair of the pairs of spaced openings to register a cassette position relative to a respective one of the plurality of receiving bays;

wherein each of the plurality of cassettes is independently accessible and removable from either the front or the back of the adapter panel.

2. The assembly according to claim 1, wherein each of the plurality of cassettes comprises a housing having spaced sides, and wherein each of the two retention features comprises a ball bearing disposed in a pocket formed in one of the spaced sides, the pocket containing a spring outwardly biasing the ball bearing toward a respective lateral side of the housing.

3. The assembly according to claim 2, wherein each of the plurality of cassettes comprises a pair of spaced tabs positioned at a forward end of the housing for manipulating the cassette position relative to the adapter panel.

4. The assembly according to claim 1, wherein each of the plurality of receiving bays are defined between two adjacent vertical dividers or between one vertical divider and one side of the spaced sides of the adapter panel, and wherein each vertical divider comprises lateral features for engaging two adjacent ones of the plurality of cassettes.

5. The assembly according to claim 4, wherein each of the plurality of receiving bays are subdivided into two sub-bays by a pair of vertically aligned spaced guides, and wherein each pair of vertically aligned spaced guides engages two adjacent ones of the plurality of cassettes.

6. The assembly according to claim 5, wherein each of the plurality of cassettes comprises a housing having spaced sides each including an elongate first rail and an elongate second rail, wherein the first rails engage with the lateral features of one of the vertical dividers and the second rails engage with one of the pairs of vertically aligned spaced guides.

7. The assembly according to claim 1, wherein each of the plurality of receiving bays is dimensioned to receive two cassettes of the plurality of cassettes.

8. The assembly according to claim 1, further comprising guides disposed in the interior of the chassis and rails affixed to the adapter panel and engaged with the guides, wherein the guides and the rails guide horizontal translation of the adapter panel relative to the chassis.

9. The assembly according to claim 1, wherein each of the plurality of cassettes comprises at least one adapter having a frontside including a plurality of vertically stacked ports for receiving a corresponding number of mini duplex connector (MDC) optical fiber connectors, and a backside for receiving connectorized optical fibers from within the cassette.

10. An adapter panel assembly for being slidably mounted in an interior of a rack-mountable chassis, comprising:

an adapter panel including a top and a bottom interconnected by spaced sides, the adapter panel defining a plurality of receiving bays open along a front and a back of the adapter panel, each of the top and the bottom of the adapter panel including a linear array of spaced openings extending between the spaced sides, wherein the spaced openings in the top align with the spaced openings in the bottom to form vertically aligned pairs of spaced openings with each pair of spaced openings including one top opening and one bottom opening, and wherein each pair of spaced openings corresponds to one position in one of the plurality of receiving bays; and a plurality of cassettes received in the plurality of receiving bays in a vertical orientation, wherein each of the plurality of cassettes includes two retention features for engaging in one pair of the pairs of spaced openings to register a cassette position relative to a respective one of the plurality of receiving bays;

wherein each of the plurality of cassettes is independently accessible and removable from the front or the back of the adapter panel.

11. The assembly according to claim 10, wherein each of the plurality of cassettes comprises a housing having spaced sides, and wherein each of the two retention features comprises a ball bearing disposed in a pocket formed in one of the spaced sides, the pocket containing a spring outwardly biasing the ball bearing toward a respective lateral side of the housing.

12. The assembly according to claim 10, wherein each of the plurality of cassettes comprises a pair of spaced tabs positioned at a forward end of the housing for manipulating the cassette position relative to the adapter panel.

13. The assembly according to claim 10, wherein each of the plurality of receiving bays are defined between two adjacent vertical dividers or between one vertical divider and one side of the spaced sides of the adapter panel, and wherein each vertical divider comprises lateral features for engaging two adjacent ones of the plurality of cassettes.

14. The assembly according to claim 13, wherein each of the plurality of receiving bays are subdivided into two sub-bays by a pair of vertically aligned spaced guides, and wherein each pair of vertically aligned spaced guides engages two adjacent ones of the plurality of cassettes.

15. The assembly according to claim 14, wherein each of the plurality of cassettes comprises a housing having spaced sides each including an elongate first rail and an elongate second rail, wherein the first rails engage with the lateral features of one of the vertical dividers and the second rails engage with one of the pairs of vertically aligned spaced guides.

16. The assembly according to claim 10, wherein each of the plurality of receiving bays is dimensioned to receive two cassettes of the plurality of cassettes.

17. The assembly according to claim 10, wherein each of the plurality of cassettes comprises at least one adapter having a frontside including a plurality of vertically stacked ports for receiving a corresponding number of mini duplex connector (MDC) optical fiber connectors, and a backside for receiving connectorized optical fibers from within the cassette.

18. The assembly according to claim 17, wherein each of the plurality of cassettes comprises a multifiber adapter receiving a first multifiber connector from within the cassette.

19. The assembly according to claim 17, wherein each of the plurality of cassettes comprises a clamp for compressing around a cable entering or exiting the cassette.

* * * * *